March 6, 1928.
R. H. GODDARD ET AL
ACCUMULATOR FOR RADIANT ENERGY
Filed June 10, 1924
1,661,473
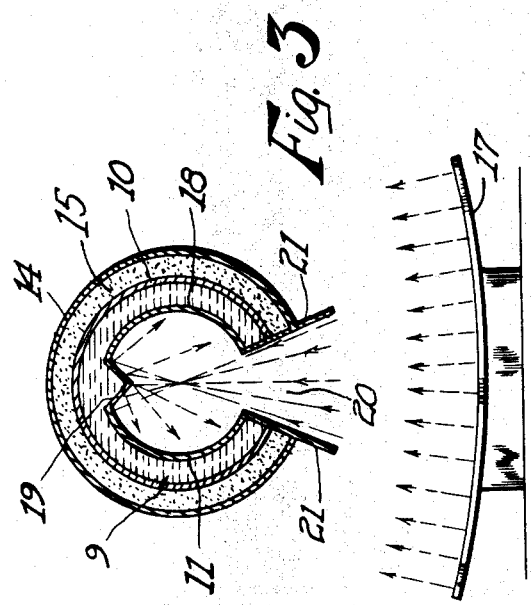
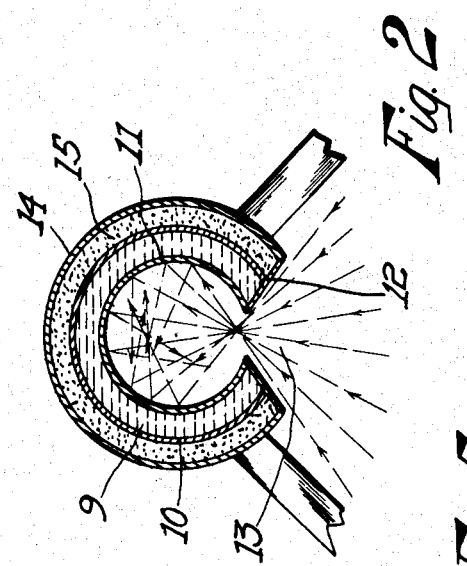
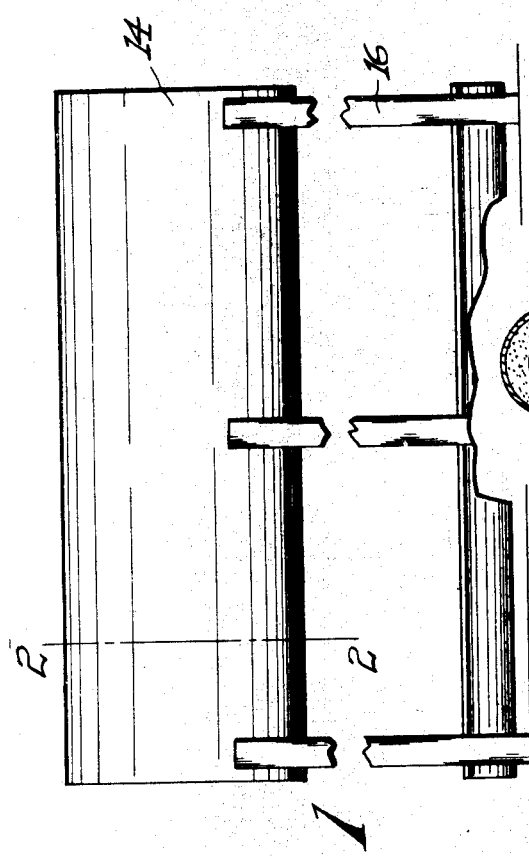
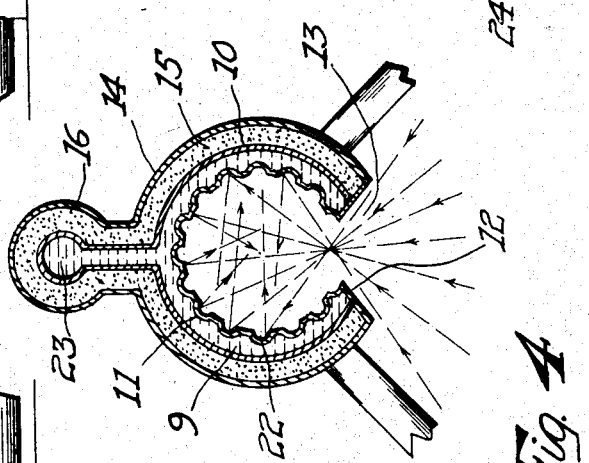
Inventors
Robert H. Goddard
Nils A. Riffolt
By Attorneys
Southgate & Southgate Patented Mar. 6, 1928.

1,661,473

UNITED STATES PATENT OFFICE.

ROBERT H. GODDARD AND NILS AUGUST RIFFOLT, OF WORCESTER, MASSACHUSETTS.

ACCUMULATOR FOR RADIANT ENERGY.

Application filed June 10, 1924. Serial No. 719,201.

This invention relates to an accumulator for receiving and storing radiant energy, such as that transmitted from the sun. It is the general object of our invention to provide means whereby a maximum amount of radiant energy may be absorbed and accumulated for future transformation into useful work, while at the time there is a minimum loss of energy by radiation.

A further object of our invention is to provide an accumulator for radiant energy in which the energy or heat will be distributed over a relatively large surface, thereby avoiding concentration of heat on a small area.

Our invention further relates to arrangements and combinations of parts which will be hereinafter described and more particularly pointed out in the appended claims.

Several forms of our invention are shown in the drawings, in which

Fig. 1 is a side elevation of one form of our improved accumulator;

Fig. 2 is a transverse sectional elevation, taken along the line 2—2 in Fig. 1;

Figs. 3 and 4 are transverse sectional elevations of modified forms of our invention; and Fig. 5 is a detail sectional view to be described.

Referring to Figs. 1 and 2, our improved accumulator is shown therein as comprising an elongated receptacle 9 forming a substantially crescent shaped segment and having an outer convex surface 10 and an inner concave surface 11. The parts 10 and 11 are joined together by end portions 12 which are spaced apart to provide a relatively narrow slit or opening 13 extending longitudinally of the receptacle 9.

The outer wall 10 of the receptacle is preferably protected by a casing 14 and insulating material 15. The casing 14 may be given a highly polished surface if desired, to assist in preventing radiation therefrom.

The accumulator above described is preferably mounted in a horizontal or slightly inclined position, as by supports 16, and is positioned above a mirror or reflecting surface 17 by which the rays of the sun will be reflected to the narrow slit or opening 13. The paths of the reflected rays are clearly indicated in Fig. 2, from which it will be seen that the rays of energy are widely distributed over the inner concave surface 11. This inner surface is preferably blackened or otherwise treated so that it will readily absorb radiant energy reflected thereto.

The receptacle 9 is filled with a suitable liquid for absorbing radiant energy, such as water, mercury, or ammonia, and the energy or heat thus accumulated may be utilized in any convenient manner.

In Fig. 3 we have shown a modified form of accumulator in which the inner surface 18 is provided with mirror or reflecting portions 19 opposite the slit or opening 20. These reflecting portions may be highly polished metal surfaces and should be of such material that they will be uninjured by the intense heat directed thereto. A metal surface plated with platinum and highly polished is found desirable for use in this form of our invention. With this construction, the slot 20 may be somewhat narrower than in the form previously described, as the energy entering through the slit is diverted and distributed over the inner surface by the reflecting surfaces 19. The end portions or flanges 21 are also preferably formed with reflecting surfaces to assist in directing the rays into the opening 20.

In Fig. 4 we have shown a second modification of our invention in which the inner surface 22 is provided with alternate grooves and ridges which present increased absorbing surface to the rays of energy directed thereto. In this form of our invention, the liquid receptacle or accumulator may also be provided with an upwardly projecting portion 23 in which steam or other heated vapor may collect and from which it may be conveniently removed for use.

In Fig. 5, we have indicated a form of lens 24 which may be used in combination with any form of our invention to receive the reflected rays from the mirror surface 17 and to deflect them in straight parallel paths toward the slit or opening in the accumulator. This lens is particularly desirable when used with the form of accumulator shown in Fig. 3, as the deflected rays of energy more directly engage the reflecting surfaces 19. The lens 24 is preferably formed of rock salt, as this material permits substantially free passage of heat without absorption thereof. The slit or opening in the accumulator may obviously be made narrower when the lens is used.

In all forms of our invention, it will be seen that we have provided a comparatively thin or shallow layer of heat-absorbing liquid in contact with a relatively large heat-absorbing surface, all of which surface is exposed to the rays of energy directed thereto, while at the same time the re-radiation of energy from the accumulator is effectively prevented by the heat-insulating material 15 and the outer casing 14. The inner surfaces of the accumulator are also so disposed that it is practically impossible for any ray of energy entering the slit or opening in the side of the accumulator to be again reflected outward through the opening. The invention described is of great utility, particularly in countries where the heat of the sun is intense and where fuel is scarce and expensive.

Having thus described our invention and the advantages thereof, we do not wish to be limited to the details herein disclosed otherwise than as set forth in the claims, but what we claim is:—

1. An accumulator for radiant energy comprising a receptacle having longitudinally extended outer wall and an inner wall with an adjacent longitudinally extended energy retaining and energy absorbing surface, said inner and outer walls being separated by a comparatively thin layer of energy absorbing liquid of substantially uniform thickness, and said walls having an opening through which to admit and to distribute radiant energy over substantially all of the energy absorbing surface.

2. An accumulator for radiant energy comprising a longitudinally extended and substantially cylindrical receptacle having a convex outer surface and a concave energy absorbing inner surface, said surfaces being substantially uniformly spaced apart to receive a comparatively thin layer of energy absorbing liquid in said receptacle and said receptacle having a relatively narrow longitudinally extended heat-admitting opening along one side thereof.

3. An accumulator for radiant energy comprising a receptacle having an inner heat-receiving surface and having a longitudinal opening between adjacent portions of said receptacle through which heat may be directed against said inner surface, portions of said inner surface being polished to deflect the heat rays over substantially the entire inner surface of the receptacle.

4. An accumulator for radiant energy comprising a receptacle containing an energy-absorbing liquid and having an inner energy-absorbing surface with the end portions thereof separated to provide an opening through which energy may be directed to said surface, a portion of said inner surface being also effective to re-direct the radiant energy over a relatively large absorbing surface.

5. An accumulator for radiant energy, comprising a substantially cylindrical receptacle of annular cross section and having a narrow longitudinally extended energy admitting opening at the lower side thereof, a frame to support said receptacle in raised position, and a concave mirror mounted below said receptacle and effective to receive heat rays from the sun and to reflect said rays into said narrow opening.

In testimony whereof we have hereunto affixed our signatures.

ROBERT H. GODDARD.
NILS A. RIFFOLT.